Figure 1:
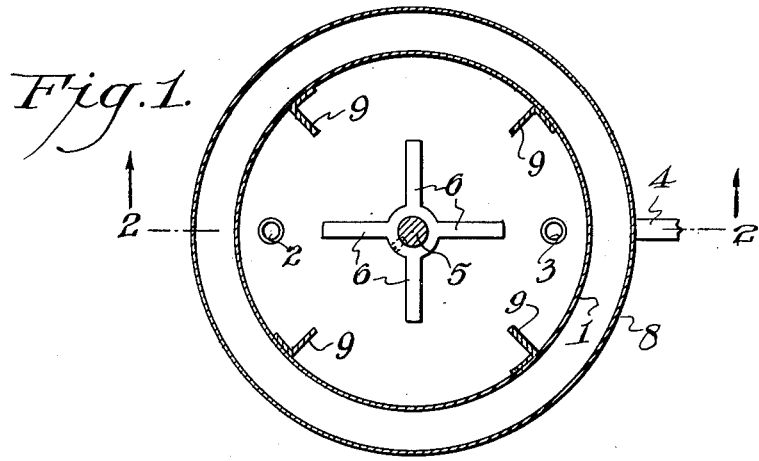

April 12, 1955

T. PARSONS 2,706,205

CONTINUOUS PROCESS FOR THE MANUFACTURE
OF TETRAMETHYL THIURAM MONOSULFIDE

Filed Oct. 8, 1953

INVENTOR

Theophilus Parsons

BY *Cullen G. Frey*

ATTORNEY ns
2,706,205

CONTINUOUS PROCESS FOR THE MANUFACTURE OF TETRAMETHYL THIURAM MONOSULFIDE

Theophilus Parsons, Woodstown, N. J., assignor to E. I. du Pont de Nemours and Company, Wilmington, Del., a corporation of Delaware Application October 8, 1953, Serial No. 385,003

3 Claims. (Cl. 260—567)

This invention relates to an improved process for the manufacture of organic monosulfides, and more particularly to a continuous process for the manufacture of tetramethyl ethiuram monosulfide from sodium dimethyl dithiocarbamate and cyanogen chloride.

Tetramethyl thiuram monosulfide, which is an important rubber chemical, may be prepared from sodium dimethyl dithiocarbamate and cyanogen chloride according to the following equation:

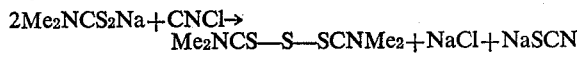

$2Me_2NCS_2Na + CNCl \rightarrow Me_2NCS-S-SCNMe_2 + NaCl + NaSCN$

Heretofore, this reaction has been carried out as a batch operation, the cyanogen chloride being fed into a solution of the dithiocarbamate until the reaction is complete, as more particularly described in U. S. Patent No. 1,788,632 to Powers. By this batch operation a good yield of the monosulfide of satisfactory purity is obtained; however, when the reaction is carried out by a continuous process involving mixing the sodium dimethyl dithiocarbamate and cyanogen chloride continuously and allowing the reaction to proceed, both the yield and purity of the monosulfide obtained are unsatisfactory. Therefore, an efficient continuous process which would produce the monosulfide in good yields of satisfactory purity would be highly desirable both from the point of view of direct savings in equipment, operating labor and indirectly through integration with other operations.

This invention has as an object to provide an improved method for the manufacture of tetramethyl thiuram monosulfide. A further object of this invention is to provide a continuous process for the manufacture of tetramethyl thiuram monosulfide which is efficient and economical to operate and which will produce the tetramethyl thiuram monosulfide in good yields and of high purity.

By this invention tetramethyl thiuram monosulfide may be prepared conveniently, rapidly and cheaply in high yields and purity by carrying out a continuous reaction of cyanogen chloride and dimethyl dithiocarbamate in a solution containing an alkali or, preferably, a buffer. By the addition of alkalies or buffers, or both, to the dithiocarbamate solution, the pH of the reaction mass is readily controlled, and when the pH of the effluent reaction solution is kept between about 7 and 9 both the purity and yield of the tetramethyl thiuram monosulfide are greatly increased.

This reaction may be carried out in any equipment in which the reactants can be continuously added and mixed together until the reaction is completed and the resulting product continuously removed from the reaction zone.

Figure 2:
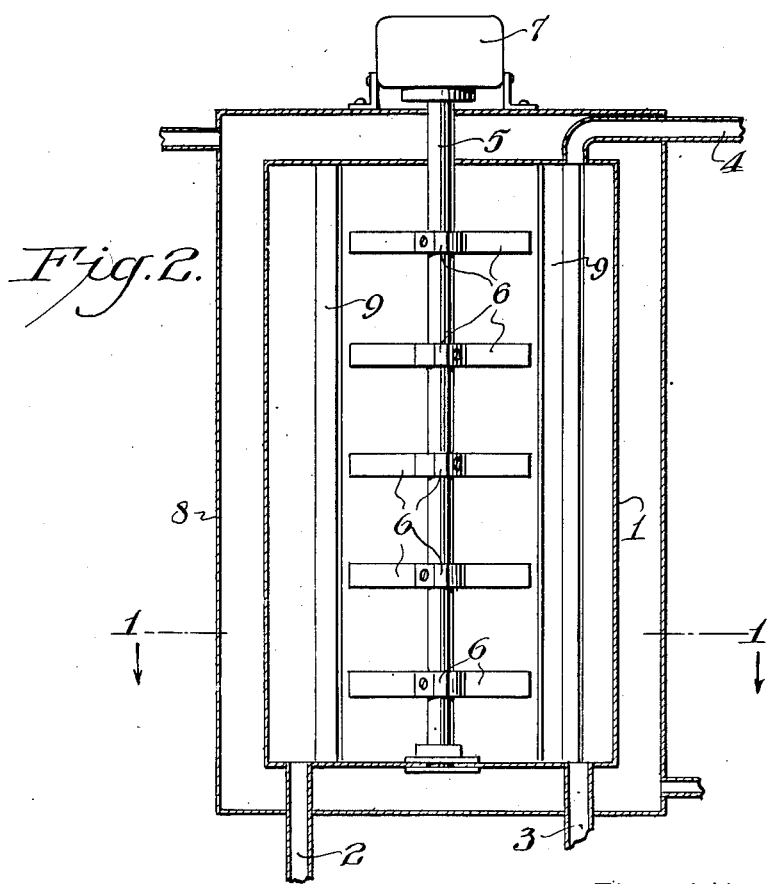

The attached drawing, which forms a part of this application, shows in Figure 1 a cross-section of one form of reactor in which the process of the present invention may be carried out. Figure 2 shows a vetrical section on the lines 2—2 of Figure 1.

In an apparatus such as shown in the drawing, the sodium dimethyl dithiocarbamate solution containing a buffer, and the cyanogen chloride, are introduced as separate streams into the vessel 1 through inlets 2 and 3, respectively, while the reaction product is taken off at the top of the reactor from the outlet 4. The reactor is provided with an agitator 5, having agitating vanes 6 equally spaced along the shaft. The agitator may be driven by a motor or other power equipment 7. The reaction vessel 1 may be jacketed as indicated at 8 through which water may be circulated to permit control of the reaction temperature. The vanes of the agitator 5, as indicated in Figure 1, are straight paddle type vanes which permit agitation at the several levels throughout the reaction vessel. Baffles 9 are provided to increase the turbulence and reduce the tendency to form a vortex as the solution is agitated.

The vessel may be made of any material that will not be attacked by the reactants. In small equipment the vessel may be made of glass and the baffles omitted.

The following specific example is given to illustrate the invention. The parts used are by weight, unless otherwise indicated.

Example

A 14% solution of sodium dimethyl dithiocarbamate containing 0.7 (5% based on the sodium dimethyl dithiocarbamate) of disodium phosphate ($Na_2HPO_4 \cdot 7H_2O$) at 27 C. is fed at the rate of 212 parts per minute and cyanogen chloride, as a gas, is fed at the rate of 6.6 parts per minute into a continuous mixing apparatus such as illustrated in the drawing, having a volume sufficient to give a residence or hold-up time in the reactor of approximately 18 minutes. Feed ratios are therefore approximately 2.02 mols of sodium dimethyl dithiocarbamate per mol of cyanogen chloride. The gas is rapidly dissolved in the reaction mass with the evolution of heat, and the temperature of the reacting solution is maintained at about 37° C. by the use of cooling means such as circulation of water through a jacket about the vessel. The effluent reaction mass, which has a pH of about 7.5, is cooled to below 30° C. and filtered. The filtering may be carried out on the usual type of continuous filters. The yield of the tetramethyl thiuram monosulfide is approximately 94% of theory, based on the sodium dimethyl dithiocarbamate, or 95% based on the cyanogen chloride employed. The melting point of the product is 108.9°–110.0° C.

In this example, 1% of sodium carbonate, $Na_2CO_3$, based on the weight of the sodium dimethyl dithiocarbamate (0.14% of the solution) may be substituted for the disodium phosphate to give substantially the same results.

Other forms of continuous reactors may be employed in carrying out this invention, the essential feature of the present invention being the control of the pH whereby the effluent solution is taken from the reaction zone at from 7 to 9.

The dithiocarbamate fed to the reaction zone is preferably in the form of a 10% to 25% solution. Other concentrations are operable, but solutions more dilute than 10% are increasingly less economical because of the larger equipment required, while solutions more concentrated than about 25% are difficult to handle.

The mol ratio of the cyanogen chloride and the dithiocarbamate should be between about 1:1.95 to 1:2.20. While ratios outside this range have been found to be operable, the preferred range has been found to be the most economical.

While in the example the cyanogen chloride is introduced into the reaction solution as a gas, it may also be introduced as an aqueous solution or in liquid form.

The reaction is run so that the exit temperature is preferably between 30° and 40° C. At these temperatures the time required to complete the reaction will be from 10 to 40 minutes. Where the pH of the effluent solution falls appreciably below 7, both the purity and yield of the tetramethyl thiuram monosulfide are decreased. The pH of the effluent solution is preferably maintained at from 7 to 8.

While the buffers employed in the specific example are disodium phosphate or sodium carbonate, other buffers or alkaline materials may be used, such as caustic alkalies, borax, sodium acetate, etc. Sodium carbonate and disodium phosphate are preferred.

I claim:

1. In a continuous process for the manufacture of tetramethyl thiuram monosulfide in which cyanogen chloride is continuously mixed with an aqueous solution of sodium dimethyl dithiocarbamate, the step which comprises controlling the pH of the reaction solution by the addition of an alkaline buffer to the solution so that as the reaction is completed the effluent solution has a pH of from about 7 to 9.

2. A continuous process for the manufacture of tetramethyl thiuram monosulfide which comprises continuously mixing cyanogen chloride with an alkaline aqueous 10% to 25% solution of sodium dimethyl dithiocarbamate containing as the alkaline agent disodium hydrogen phosphate, the mol ratio of the cyanogen chloride to the dithiocarbamate being from 1:1.95 to 1:2.20, the reaction being carried out at temperatures from 30° to 40° C. and the pH of the solution being maintained so that the effluent reaction solution is between about 7 and 9.

3. A continuous process for the manufacture of tetramethyl thiuram monosulfide which comprises continuously mixing cyanogen chloride with an alkaline aqueous 10% to 25% solution of sodium dimethyl dithiocarbamate containing as the alkaline agent sodium carbonate, the mol ratio of the cyanogen chloride to the dithiocarbamate being from 1:1.95 to 1:2.20, the reaction being carried out at temperatures from 30° to 40° C. and the pH of the solution being maintained so that the effluent reaction solution is between about 7 and 9.

References Cited in the file of this patent

UNITED STATES PATENTS 1,788,632   Powers   Jan. 13, 1931